US008612195B2

(12) United States Patent
Sun et al.

(10) Patent No.: US 8,612,195 B2
(45) Date of Patent: Dec. 17, 2013

(54) GRADIENT-BASED WORKFLOWS FOR CONDITIONING OF PROCESS-BASED GEOLOGIC MODELS

(75) Inventors: Tao Sun, Missouri City, TX (US); Kaveh Ghayour, Houston, TX (US); Matthias Imhof, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 83 days.

(21) Appl. No.: 13/148,642

(22) PCT Filed: Dec. 3, 2009

(86) PCT No.: PCT/US2009/066608
§ 371 (c)(1),
(2), (4) Date: Aug. 9, 2011

(87) PCT Pub. No.: WO2010/104536
PCT Pub. Date: Sep. 16, 2010

(65) Prior Publication Data
US 2011/0315376 A1    Dec. 29, 2011

Related U.S. Application Data

(60) Provisional application No. 61/159,359, filed on Mar. 11, 2009.

(51) Int. Cl.
*G06G 7/48*    (2006.01)
(52) U.S. Cl.
USPC .......................................................... 703/10
(58) Field of Classification Search
USPC .......... 703/9, 10, 6; 166/250.01, 250.17, 266, 166/336, 369
See application file for complete search history.

(56) References Cited

U.S. PATENT DOCUMENTS

| 4,958,073 A | 9/1990 | Becker et al. |
| 5,239,474 A | 8/1993 | Eaton, Jr. et al. |

(Continued)

FOREIGN PATENT DOCUMENTS

| FR | 2852710 | 9/2004 |
| WO | WO 2006/066166 | 6/2006 |

(Continued)

OTHER PUBLICATIONS

Bängtsson, E. et al. (2003) "Shape optimization of an acoustic horn," *Computational Methods in Applied Mechanics and Engineering* 192, pp. 1533-1871.

(Continued)

*Primary Examiner* — Kamini S Shah
*Assistant Examiner* — Andre Pierre Louis
(74) *Attorney, Agent, or Firm* — ExxonMobil Upstream Research Company, Law Dept.

(57) ABSTRACT

A method for correlating predicted data describing a subsurface region with obtained data describing the subsurface region is provided. Data is obtained describing an initial state of the subsurface region. Data describing a subsequent state of the subsurface region is predicted. A likelihood measure that determines whether the predicted data is within an acceptable range of the obtained data is dynamically and/or interactively updated. The predicted data is compared with the obtained data using the likelihood measure and determining a sensitivity of the predicted data if the predicted data is not within an acceptable range of the obtained data as measured by the likelihood measure. Data describing the initial state of the subsurface region is adjusted based on the sensitivity before performing a subsequent iteration of predicting data describing the subsequent state of the subsurface region. The predicted data is outputted.

16 Claims, 4 Drawing Sheets

(56) References Cited

U.S. PATENT DOCUMENTS

| | | |
|---|---|---|
| 5,249,122 A | 9/1993 | Stritzke |
| 5,334,833 A | 8/1994 | Case et al. |
| 5,488,373 A | 1/1996 | Hellsten |
| 5,583,825 A | 12/1996 | Carrazzone et al. |
| 5,588,032 A | 12/1996 | Johnson et al. |
| 5,729,451 A | 3/1998 | Gibbs et al. |
| 5,761,346 A | 6/1998 | Moody |
| 5,844,799 A | 12/1998 | Joseph et al. |
| 5,892,700 A | 4/1999 | Haardt |
| 5,995,906 A | 11/1999 | Doyen et al. |
| 6,005,916 A | 12/1999 | Johnson et al. |
| 6,070,125 A | 5/2000 | Murphy et al. |
| 6,151,566 A | 11/2000 | Whiffen |
| 6,246,963 B1 | 6/2001 | Cross et al. |
| 6,381,543 B1 | 4/2002 | Guerillot et al. |
| 6,636,584 B2 | 10/2003 | Johnson et al. |
| 6,643,589 B2 | 11/2003 | Zhang et al. |
| 6,674,432 B2 | 1/2004 | Kennon et al. |
| 6,754,588 B2 | 6/2004 | Cross et al. |
| 6,756,592 B1 | 6/2004 | Smith et al. |
| 6,829,538 B2 | 12/2004 | Kok |
| 6,834,234 B2 | 12/2004 | Scherzinger et al. |
| 6,904,366 B2 | 6/2005 | Patzek et al. |
| 6,941,255 B2 | 9/2005 | Kennon et al. |
| 6,999,880 B2 | 2/2006 | Lee |
| 7,006,951 B2 | 2/2006 | Pond, Jr. et al. |
| 7,027,964 B2 | 4/2006 | Kennon |
| 7,043,367 B2 | 5/2006 | Granjeon |
| 7,043,413 B2 | 5/2006 | Ward et al. |
| 7,065,511 B2 | 6/2006 | Zhao et al. |
| 7,079,953 B2 | 7/2006 | Thorne et al. |
| 7,117,091 B2 | 10/2006 | Masson et al. |
| 7,123,258 B2 | 10/2006 | Deny et al. |
| 7,149,671 B2 | 12/2006 | Lim et al. |
| 7,200,533 B2 | 4/2007 | Hu et al. |
| 7,260,508 B2 | 8/2007 | Lim et al. |
| 7,292,241 B2 | 11/2007 | Thore et al. |
| 7,337,069 B2 | 2/2008 | Masson et al. |
| 7,340,385 B2 | 3/2008 | James |
| 7,363,158 B2 | 4/2008 | Stelting et al. |
| 7,369,973 B2 | 5/2008 | Kennon et al. |
| 7,392,136 B2 | 6/2008 | Salles et al. |
| 7,502,692 B2 | 3/2009 | Chen |
| 7,516,055 B2 | 4/2009 | Strebelle |
| 7,558,715 B2 | 7/2009 | Schaaf et al. |
| 7,617,082 B2 | 11/2009 | Childs et al. |
| 7,620,534 B2 | 11/2009 | Pita et al. |
| 7,630,517 B2 | 12/2009 | Mirowski et al. |
| 7,640,149 B2 | 12/2009 | Rowan et al. |
| 7,725,266 B2 | 5/2010 | Sirgue et al. |
| 7,788,074 B2 | 8/2010 | Scheidt et al. |
| 7,805,250 B2 | 9/2010 | Colombo et al. |
| 2001/0032053 A1 | 10/2001 | Hielscher et al. |
| 2002/0120429 A1 | 8/2002 | Ortoleva |
| 2003/0130852 A1 | 7/2003 | Tanaka et al. |
| 2005/0004833 A1 | 1/2005 | McRae et al. |
| 2006/0041409 A1 | 2/2006 | Strebelle et al. |
| 2007/0219725 A1 | 9/2007 | Sun et al. |
| 2007/0255500 A1* | 11/2007 | Pita et al. ............ 702/11 |
| 2007/0276604 A1 | 11/2007 | Williams et al. |
| 2008/0005690 A1 | 1/2008 | Van Vugt |
| 2008/0015784 A1 | 1/2008 | Dorn et al. |
| 2008/0275648 A1* | 11/2008 | Illfelder ............ 702/7 |
| 2009/0006053 A1 | 1/2009 | Carazzone et al. |
| 2009/0164182 A1 | 6/2009 | Pedersen et al. |
| 2009/0312995 A1 | 12/2009 | Pyrcz et al. |
| 2010/0211370 A1* | 8/2010 | Maliassov ............ 703/10 |

FOREIGN PATENT DOCUMENTS

| | | |
|---|---|---|
| WO | WO 2009/020715 | 2/2009 |
| WO | WO 2009/138290 | 11/2009 |
| WO | WO 2010/104537 | 9/2010 |

OTHER PUBLICATIONS

Bosseur, F. et al. (2002), "Identification of boundary conditions in a nonlinear shallow water flow," *Computers & Mathematics with Applications* 43(12), pp. 1559-1573.

Bradley, J.H.S. (1976), "Recent developments in the matrix generalized eigenproblem for numerical weather simulation," 1976 Summer Computer Simulation Conf., pp. 43-45.

Bruneau, C.H. et al. (1997), "Optimal control data assimilation with an atmospheric model," *Numerical Functional Analysis and Optimization* 18(7-8), pp. 691-722.

Bunge, H.P. (2002), "Mantle-circulation models with sequential data assimilation; inferring present-day mantle structure from plate-motion histories," Philosphical Transactions—Royal Society, *Mathematical, Physical and Engineering Sciences* 360, pp. 2545-2567.

Burton, R. et al. (1987), "Out of Our Depth: on the Impossibility of Fathoming Eustasy from the Stratigraphic Record," *Earth-Science Review* 24, pp. 237-277.

Chavent, G. (1975), "History Matching by Use of Optimal Control Theory," *SPE Journal*, pp. 74-86.

Chen, W.H. (1974), "A New Algorithm for Automatic History Matching," *SPE Journal*, pp. 593-608.

Cheshire, I.M. (2001), History Matching and Numerical Well Testing,, 6th Leoben Mining Univ. Reservoir Simulation Intl. Forum, 17 pgs.

Cliffe, K. et al. (1995), "Conditioning stochastic groundwater flow", Materials Research Society Symposium Proceedings 353, pp. 455-462.

Collis, S.S. et al. (2002) "Optimal Control of Unsteady Compressible Viscous Flows," *Int'l. J. for Numerical Methods in Fluids* 40, pp. 1401-1429.

Cui, H. et al. (2005), "Automatic History Matching of Naturally Fractured Reservoirs and a Case Study," SPE 94037, 2005 SPE Western Regional Mtg., 9 pgs.

Daoud, A.M. et al. (2005), "3D Field-Scale Automatic History Matching Using Adjoint Sensitivities and Generalized Travel-Time Inversion," SPE 101779, 2005 SPE Annual Tech. Conf. & Exh., 18 pgs.

Eydinov, D. et al. (2006), "Compositional and Grid Orientation Effects in History Matching", SPE 102676, 2006 SPE Annual Tech. Conf. & Exh., 8 pgs.

Franssen, H. et al. (1997), "Stochastic inverse modeling of transient groundwater flow," Proceedings of the Annual Conference of the International Association for Mathematical Geology 3, pp. 778-783.

Gejadze, I.Y. et al. (2006), "Open Boundary Control Problem for Navier-Stokes Equations including a Free Surface: Data Assimilation," *Computer Mathematics with Applications* 52, pp. 1269-1288.

Hier-Majumder, C.A. et al. (2006), "Efficient sensitivity analysis for flow and transport in the Earth's crust and mantle," *Geophys. J. Int.* 166, pp. 907-922.

Honnorat, M. et al. (2009), "Lagrangian data assimilation for river hydraulics simulations," *Comput. Visual Sci.* 12, pp. 235-246.

Howard, A. et al. (1984), "Sufficient Conditions for River Meandering: A Simulation Approach," *Water Resources Research* 20(11), pp. 1659-1667.

Ikeda, S. et al. (1981), "Bend theory of river meanders, 1, Linear development," *J. of Fluid Mechanics* 112, pp. 363-377.

Jiafeng, W. et al. (2002), "Adjoint approach to VDA of "on-off" process based on nonlinear perturbation equation," *Progress in Natural Science* 12(11), pp. 185-189.

Junqing, Y. (1998), "Variational data assimilation in the transport of sediment in river," XP007910712, *Science in China* 41(5), pp. 473-485.

Jurado, F. et al. (1995), "1-D layered media: Part 2, Layer-based waveform inversion," *Geophysics* 60(6), pp. 1857-1869.

Karssenberg, D. et al. (2001), "Conditioning a Process-Based Model of Sedimentary Architecture to Well Data," *J. of Sedimentary Research* 71(6), pp. 868-879.

Kim, J. et al. (1998), "Existence and regularity of weak periodic solutions of the 2-D wave equation," *Nonlinear Analysis, Theory, Methods & Applications* 32(7), pp. 867-870.

(56) References Cited

OTHER PUBLICATIONS

Kivva, S.L. (2003), "Refinement of Model Parameters of Radionuclide Transport with Surface Water while Assimilation of Observational Data," *J. of Automation and Information Sciences* 35(5-8), pp. 50-66.

Lancaster S.T. (2002), "A simple model of river meandering and its comparison to natural channels," *Hydrological Processes* 16, pp. 1-26.

Lardner, R.W. (1993), "Optimal control of open boundary conditions for a numerical tidal model," *Computer Methods in Applied Mechanics & Engineering* 102(3), pp. 367-387.

LeDimet, F. et al. (2006), "On optimal solution error in variational data assimilation: theoretical aspects," *Russian J. of Numerical Analysis and Mathematical Modelling* 21(2), pp. 139-152.

Li, R. et al. (2003), "History Matching of Three-Phase Flow Production Data," *SPE Journal* 8(4), pp. 328-340.

Liu, N. et al. (2003), "Automatic History Matching of Geologic Facies," SPE 84594, SPE Annual Tech. Conf. & Exh., 10 pgs.

Lorentzen, R.J. et al. (2006), "A New Approach for Dynamic Optimization of Waterflooding Problems," SPE 99690, 2006 SPE Intelligent Energy Conf. & Exh., 11 pgs.

Marchuk, G.I. et al. (2001), "Mathematical modeling of marine and oceanic currents," *Russian J. of Numerical Analysis and Mathematical Modeling* 16(4), pp. 331-362.

Marler, H.T. et al. (2004), "Survey of multi-objective optimization methods for engineering", *Structural & Multidiscplinary Optimization* 26(6), pp. 369-395.

Masumoto, K. (2005), "Inverse modeling unsaturated heterogeneous media by two-phase pressure derivative matching," *J. of Hydraulic Research* 43(2), pp. 196-201.

Masumoto, K. (2000), "Pressure derivative matching method for two phase fluid flow in heterogeneous reservoir," Proceedings of the SPE Asia Pacific Conf. on Integrated Modeling for Asset Management, pp. 577-584.

Mufti, I.R. (1976), "Finite-Difference Resistivity Modeling for Arbitrarily Shaped Two-Dimensional Structures," *Geophysics* 41(1), pp. 62-78.

Navon, I. et al. (1991), "Optimal control methods and efficient minimization algorithms for variational data assimilation in meterology," Singapore Supercomputing Conf., pp. 272-331.

Nueman, S.P. (1985), "Maximum-likelihood adjoint-state finite-element estimation of groundwater parameters under steady- and nonsteady-state conditions," *Appl. Mathematics and Computation* 17, pp. 405-432.

Piasecki, M. (2004), "Optimal wasteload allocation procedure for achieving dissolved oxygen water quality objectives: I: Sensitivity analysis," *J. of Environmental Engineering* 130(11), pp. 1322-1334.

Piasecki, M. et al. (1999), "Identification of Stream Dispersion Coefficients by Adjoint Sensitivity Method," *J. of Hydraulic Engineering*, pp. 714-724.

Quenes, A. et al. (1992), "Simulated Annealing for Interpreting Gas/Water Laboratory Corefloods," SPE 24870, 67th Ann. Tech. Conf. & Exh., pp. 43-55.

Rodrigues, J.R.P. (2005), "Calculating Derivatives for History Matching in Reservoir Simulators," SPE 93445, 2005 SPE Reservoir Simulation Symposium, 9 pgs.

Sarma, P. et al. (2005), "Implementation of Adjoint Solution for Optimal Control of Smart Wells," SPE 92864, 2005 SPE Reservoir Simulation Symposium, 17 pgs.

Sanders, B. (2000), "Adjoint Sensitivity Analysis for Shallow-Water Wave Control," *J. of Engineering Mechanics*, pp. 909-919.

Scott, T.R. et al. (2007), "Data assimilation for a coastal area morphodynamic model: Morecambe Bay," *Coastal Engineering* 54, pp. 91-109.

Seminara, G. (2006), "Meanders," *J. of Fluid Mechanics* 554, pp. 271-297.

Sidar, M. (1968), "An iterative algorithm for optimum control problems," *Int. Nonlinear Mech.* 3(1), pp. 1-16.

Sun, T. et al. (1996), "A simulation model for meandering rivers," *Water Resources Research*, 32(9), pp. 2937-2954.

Symes, W.W. et al. (1994), "inversion of reflection seismograms by differential semblance analysis: algorithm structure and synthetic examples," *Geophys. Prospecting* 42(6), pp. 565-614.

Tong, A. et al. (1995), "Unified approach for stochastic parameter estimation, experimental design, and reliability analysis in groundwater modeling," 22nd Annual Conf. Integr. Water resources Planning, pp. 895-898.

Vakili, A. et al. (2005), "On the Adjoint of a Nonlinear Diffusion-Convection Equation to Describe Flow in Porous Media," SPE 93566, SPE Middle East Oil and Gas Show and Conference, 12 pgs.

Van Doren, J. et al. (2004), "Reduced-order optimal control of waterflooding using POD," 9th EAGE Math. of Oil Recovery Europe Conference, 8 pgs.

Vos, R.J. et al. (2000), "Integrated data-modelling approach for suspended sediment transport on a regional scale," *Coastal Engineering* 41, XP007910706, pp. 177-200.

Wang, J. et al. (2002), "Adjoint approach to VDA of 'on-off' processes based on nonlinear perturbation equation," XP007910929, *Progress in Natural Science* 12(11), pp. 869-873.

Wang, H. (1999), "A family of Eulerian-Lagrangian localized adjoint methods for multi-dimensional advection-reaction equations," *J. of Computational Physics* 152(1), pp. 120-163.

Wang, Z. et al. (1998), "The adjoint Newton algorithm for large-scale unconstrained optimization in meteorology applications," *Computational Optimization and Applications* 10(3), pp. 283-320.

Winguth, A.M.E. et al. (1998), "Paleonutrient data analysis of the glacial using an adjoint ocean general circulation," 26 pgs.

Wu, Z. (2000), "A Newton-Raphson Iterative Scheme for Integrating Multiphase P roduction Data into Reservoir Models," SPE 62846, 2000 SPE/AAPG Regional Meeting, 12 pgs.

Wu, Z. (2003), "A Quantitative Study to Assess the Value of Pressure Data Acquired with In-Situ Permanent Sensors in Complex 3D Reservoir Models Subject to Two-Phase Fluid Flow," SPE 84375, SPE Annual Tech. Conf. & Exh., 15 pgs.

Yeh, W.G. et al. (1990), "Variational sensitivity analysis, data requirements, and parameter identification in a leaky aquifer system," *Water Resources Research* 26(9), pp. 1927-1938.

Yang, Z. (2003), "Variational inverse estimation in a cohesive sediment transport model: An adjoint approach," *Journal of Geophysical Research* 108, pp. 37-1-37-9.

Yang, J. et al. (1998), "Variational data assimilation in the transport of sediment in river," XP007910712, *Science in China* 41(5), pp. 473-485.

Zafari, M. et al. (2005), "Assessing the Uncertainty in Reservoir Description and Performance Predictions with the Ensemble Kalman Filter," SPE 95750, 2005 SPE Annual Technical Conf. & Exh., 18 pgs.

Zakirov, I. et al. (1998), "History Matching for Lauchstaedt Underground Gas Storage," SPE 39994, 1998 SPE Gas Tech. Symposium, 10 pgs.

Zhu, J. et al. (1999), "Optimal Control of Sedimentation in Navigation Channels," *J. of Hydraulic Engineering*, pp. 750-759.

European Search Report, dated Jan. 21, 2010, EP 09 16 0562.

EP Search Report, dated Jan. 5, 2010, EP 09 16 0563.

International Search Report and Written Opinion, dated Feb. 5, 2010, PCT/US2009/066609.

International Search Report & Written Opinion, dated Jan. 26, 2010, PCT/US2009/066608.

\* cited by examiner

GRADIENT-BASED WORKFLOWS FOR CONDITIONING OF PROCESS-BASED GEOLOGIC MODELS

CROSS-REFERENCE TO RELATED APPLICATION

This application is the National Stage of International Application No. PCT/US2009/066608, that published as WO 2010/104536, filed 3 Dec. 2009, which claims the benefit of U.S. Provisional Application No. 61/159,359, filed 11 Mar. 2009, each of which is incorporated herein by reference, in its entirety, for all purposes.

TECHNICAL FIELD

Disclosed techniques and methodologies relate to physics-based geologic modeling and process-based geologic modeling in the field of hydrocarbon exploration and production, and more particularly, to conditioning workflows constrained by the underlying physical processes.

BACKGROUND OF THE DISCLOSURE

This section is intended to introduce various aspects of the art, which may be associated with portions of the disclosed techniques and methodologies. This discussion is believed to assist in providing a framework to facilitate a better understanding of particular aspects of the disclosed techniques. Accordingly, it should be understood that this section should be read in this light, and not necessarily as admissions of prior art.

In recent years, there has been considerable interest in devising evolutionary geologic models which focus on the underlying physical processes and attempt to resolve them at pertinent spatial and temporal scales. One example of such a model is described in U.S. Patent Publication No. 2007/0219725, entitled "A Method For Evaluating Sedimentary Basin Properties By Numerical Modeling Of Sedimentation Processes", by Sun, et al., filed on Aug. 23, 2005. As this approach, commonly referred to as "process-" or "physics-"based geologic modeling, relies solely on fundamental laws of physics in its time evolution, it has the clear advantage of curtailing the inclusion of non-physical ad-hoc parameters which plagues most statistics-based geologic models. Although process-based geologic modeling is considered to be a great improvement over purely statistical techniques, its business relevance and value can only be realized when the modeler can also judiciously choose its parameters such that the model prediction corresponds closely to the available field data. Integration of field and production data into physics-based models is known as "conditioning" in geology.

One approach to conditioning of physics-based geologic models is to pose the problem as an optimization problem and seek for one or multiple sets of problem parameters which result in close agreement with the available data. A variety of methods can be used to search for an optimal configuration depending on whether sensitivity information (gradient with respect to problem parameters) is available or not. Gradient-based methods use both forward simulations and sensitivity information to locate a local optimal parameter set in the vicinity of the initial guess. When sensitivity information is not available, a variant of direct search techniques which relies on successive forward simulations can be used to navigate the parameter space, a vector space that has the same dimension as the number of problem parameters, and find one or more satisfactory configurations. A common element of known methods is the use of a single likelihood measure to determine whether the predicted data is within an acceptable range of known data. The terms "fitness function" and "objective function" are collectively referred to herein by the term "likelihood measure". The use of a single likelihood measure provides acceptable performance for many academic or business applications when the likelihood measure is to a great extent convex, smooth, and free of discontinuities.

In practical application, however, geological systems are quite complex and the likelihood measure can be extremely oscillatory with many discontinuities. Known methods of conditioning are practically ineffective for process-based models that model such phenomena based on fundamental physical laws. An improved method of conditioning complex processes-based models such as models of geologic features is desirable.

SUMMARY

A method for correlating predicted data describing a subsurface region with known data describing the subsurface region is disclosed. Data is obtained describing an initial state of the subsurface region. Data describing a subsequent state of the subsurface region is predicted. A likelihood measure that determines whether the predicted data is within an acceptable range of the obtained data is dynamically and/or interactively updated. The predicted data is compared with the obtained data using the likelihood measure. A sensitivity of the predicted data is determined if the predicted data is not within an acceptable range of the obtained data as measured by the likelihood measure. Data describing the initial state of the subsurface region is adjusted based on the sensitivity before performing a subsequent iteration of predicting data describing the subsequent state of the subsurface region. The predicted data is outputted.

Termination may occur if the predicted data is within the acceptable range of the obtained data. The sensitivity of the predicted data may be determined via an adjoint method. Data describing a subsequent state of the subsurface region may be predicted via a process-based model. The data describing the initial state of the subsurface region may comprise a plurality of estimates. Predicted data may be compared with the obtained data via at least a second likelihood measure if the sensitivity does not indicate an acceptable change in the comparison of the predicted data with the obtained data. The data describing the initial state of the subsurface region may be adjusted based on the likelihood measure that produces the largest change in sensitivity. The predicted data may be outputted by being displayed. Hydrocarbons may be extracted from the subsurface region using the predicted data if the predicted data is within an acceptable range of the obtained data.

A method for producing hydrocarbons from an oil and/or gas field is disclosed. Data is obtained describing an initial state of the subsurface region containing at least a part of the oil and/or gas field. Data describing a subsequent state of the subsurface region is predicted. A likelihood measure that determines whether the predicted data is within an acceptable range of the obtained data is interactively and/or dynamically updated. The predicted data is compared with the obtained data using the likelihood measure. A sensitivity of the predicted data is determined if the predicted data is not within an acceptable range of the obtained data as measured by the likelihood measure. Data describing the initial state of the subsurface region is adjusted based on the sensitivity before performing a subsequent iteration of predicting data describing the subsequent state of the subsurface region. Hydrocarbons are extracted from the oil and/or gas field using the predicted data if the predicted data is within an acceptable range of the obtained data.

The sensitivity of the predicted data may be determined via an adjoint method. The data describing the subsequent state of the subsurface region may be predicted via a process-based model. The data describing the initial state of the subsurface region may comprise a plurality of estimates. The predicted data may be compared with the obtained data using at least a second likelihood measure if the sensitivity does not indicate an acceptable change in the comparison of the predicted data with the obtained data. The data describing the initial state of the subsurface region may be adjusted based on the likelihood measure that produces the largest change in sensitivity.

A computer system is disclosed that is adapted to correlate predicted data describing a subsurface region with obtained data describing the subsurface region. The computer system comprises a processor. The computer system may also comprise a tangible, machine-readable storage medium that stores tangible, machine-readable instructions for execution by the processor. The tangible, machine-readable instructions may comprise code that is adapted to obtain data describing an initial state of the subsurface region, code that is adapted to predict data describing a subsequent state of the subsurface region, code that is adapted to update, dynamically and/or interactively, a likelihood measure that determines whether the predicted data is within an acceptable range of the obtained data, and code that is adapted to compare the predicted data with the obtained data using a likelihood measure. The tangible, machine-readable instructions may also comprise code that is adapted to determine a sensitivity of the predicted data if the predicted data is not within an acceptable range of the obtained data as measured by the likelihood measure, and code that is adapted to adjust the data describing the initial state of the subsurface region based on the sensitivity before performing a subsequent iteration of predicting data describing the subsequent state of the subsurface region.

DESCRIPTION OF THE DRAWINGS

Advantages may become apparent upon reviewing the following detailed description and drawings of non-limiting examples of embodiments in which.

DETAILED DESCRIPTION OF THE INVENTION

Figure 1:
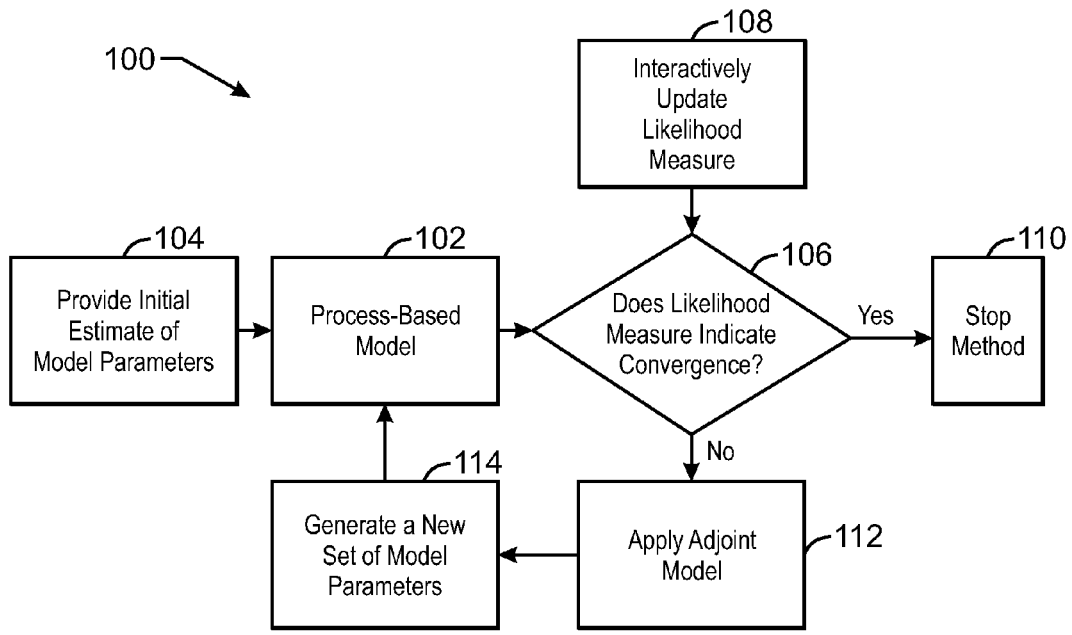
FIG. 1 is a process flow diagram showing a method for conditioning a complex process-based model using an interactively updated likelihood measure.

To the extent that the following description is specific to a particular embodiment or a particular use, this is intended to be for example purposes only and simply provides a description of the exemplary embodiments. Accordingly, the claimed method and system are not limited to what is described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "adjoint method" refers to a mathematical evaluation of the sensitivity of a predictive model such as a process-based model. Moreover, an adjoint method provides sensitivity data that represents the extent to which the output of a predictive model varies as its input varies. An adjoint method may comprise computing the gradient or sensitivity of the likelihood measure with respect to model parameters by solving an auxiliary set of equations, known as adjoint equations. The adjoint method is an efficient method for computing sensitivities of large-scale conditioning tasks and, unlike most methods, the computational cost does not scale with the number of conditioning parameters. Many types of adjoint methods are known.

As used herein, the term "conditioning" refers to the task of finding one or multiple sets of input parameters for which simulation code such as the process-based model generates outputs consistent with all or some of the data that is known about complex system attributes as observed or measured in nature. Conditioning problems are often very ill-posed due to incomplete field information or data that have the practical effect of constraining the course of the system evolution. Very often, the mathematical formulation of the conditioning process exhibits multiple extrema or discontinuities in its parameter space rendering the task of navigating the space for finding one or multiple physically meaningful conditioned scenarios extremely difficult.

As used herein, the term "convergence" occurs during an iterative data modeling procedure when predicted output data, or a function measuring error, remains substantially the same between iterations. Convergence may be used to determine an end point for the iterative process by indicating an acceptable level of correspondence between predictive data with known data at a given point in space or time.

As used herein, "displaying" is one method of outputting information. Displaying includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "hydrocarbon extraction" or "extracting hydrocarbons" includes planning the location and timing of new wells, drilling wells, removing hydrocarbons from a hydrocarbon reservoir, managing production from existing wells, predicting production lifetimes of wells or hydrocarbon reservoirs at various extraction rates, and other similar activities.

As used herein, "hydrocarbon reservoir" includes reservoirs containing any hydrocarbon substance, including for example one or more than one of any of the following: oil (often referred to as petroleum), natural gas, gas condensate, tar and bitumen. Although embodiments are presented herein with primary reference to subsurface oil and/or gas reservoirs, the principles discussed apply also to situations involving reservoirs containing other hydrocarbon materials, either in addition to or instead of oil and/or gas.

As used herein, the term "likelihood measure" refers to a function that measures the degree to which predictive data from a predictive model corresponds to known data for a particular aspect of a complex system. A likelihood measure may include a fitness function and/or an objective function.

As used herein, the terms "process-based model" or "physics-based model" refer to a predictive model that receives initial data and predicts the behaviour of a complex physical system such as a geologic system based on the interaction of known scientific principles on physical objects represented by the initial data.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "processing", "computing", "obtaining", "predicting", "updating", "comparing", "determining", "adjusting", "terminating", "performing", or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Embodiments of the present methodologies are described herein with respect to methods for conditioning process-based models to field and production data which include but are not limited to seismic data, well logs and cores, outcrop data, production flow information, or the like.

Typical parameters for a process-based model may include but are not limited to an initial topography and other input parameters of hydraulic or sedimentological nature. A time history of domain deformation and movement, such as subsidence or the like, may also be parameters. In addition, spatial and temporal distribution of physical parameters in the model and its boundary conditions may also be considered as model parameters.

A generic process-based forward model may comprise several fully-coupled or sequential sub-models. Examples of processes that may be modeled include fluid flow, or sedimentation laws governing erosion, transport, and deposition. Additional examples of processes that may be modeled include compaction and porosity reduction processes, fault and fold deformation, chemical processes such as diagenesis and fluid maturation, or the like. Other processes may be modeled accordingly as the fidelity and number of physical procedures captured in a particular forward simulation are enhanced.

In one example, a likelihood function may be employed. A user may alter the likelihood function interactively while the conditioning workflow is in progress. This feature allows for an experienced user to apply expertise to navigate the parameter space avoiding scenarios of no physical or business significance. In another example, the likelihood function may be modified dynamically as a part of the ongoing analysis method. This notion allows for dynamically updating the likelihood measure based on the current realization or the recent history of previous realizations (forward simulations) in the analysis method. In another example, the likelihood function may be modified both dynamically and interactively. Alternatively, a method of conditioning a process may include multiple likelihood measures and/or may have different starting points/initial guesses.

FIG. 1 is a process flow diagram showing a method for conditioning a complex process-based model using an interactively updated likelihood measure. The method is generally referred to by reference number 100. At block 102, a process-based model is adapted to predict data about a future condition of a complex environment, such as a portion of the earth's subsurface region. At block 104 an estimate of initial parameters is provided to the process-based model. Based on the initial estimate about the state of certain data parameters regarding the system being modeled, the process-based model may be used to predict the evolution of the system in both space and time.

The input parameters of most geological processes are not measurable or collectable and the field information gathered from seismic, well logs, core, outcrops or meander bends are all of an output data type and are not typically useful to be entered into the forward model to start a simulation. Moreover, a process-based model that predicts future conditions in a complex system may be conditioned by analyzing the equations that make up the process-based model to take into account characteristics described by known data.

At block 106, an evaluation is made regarding whether a likelihood measure applied to the output data provided by the process-based model indicates convergence between a current iteration of predicted and known data that has been obtained. Specifically, the data currently predicted by the process-based model may be fed into a likelihood function which determines the fitness of the current set of parameters, i.e., the degree to which the current set of parameters corresponds to known data.

As shown at block 108, a user may interactively update a likelihood measure that measures whether convergence has been achieved. As set forth above, the process of modeling complex systems sometimes stalls in unsatisfactory local extrema which prevent the user from obtaining a useful match with the field data. The ability to interactively update the likelihood measure allows an experienced user to change course by switching to another likelihood measure, thereby preventing the workflow from wasting computational resources in a local extrema of the current likelihood measure without improving the quality of the match with the known data.

If data predicted by the process-based model is within an acceptable range of the known data as measured by the current likelihood measure, method 100 stops, as shown at block 110. If the predicted data is not within an acceptable range of known data, an adjoint method may be applied to condition the output of the process-based model. Sensitivity information derived from the application of an adjoint method is then used to update the current estimated input parameters that are passed on to the process-based model to compute the next iteration of predicted data, as shown at block 114. The method of iteratively refining the predicted data terminates (block 110) when the likelihood measure is higher than a prescribed likelihood limit as measured by the current likelihood measure. Alternatively, the method may terminate if a time-constraint gets violated. The process-based model and/or the predicted data may be outputted by displaying or outputted in other ways, and hydrocarbon extraction may be conducted based on the outputted/displayed model or data.

Figure 2:
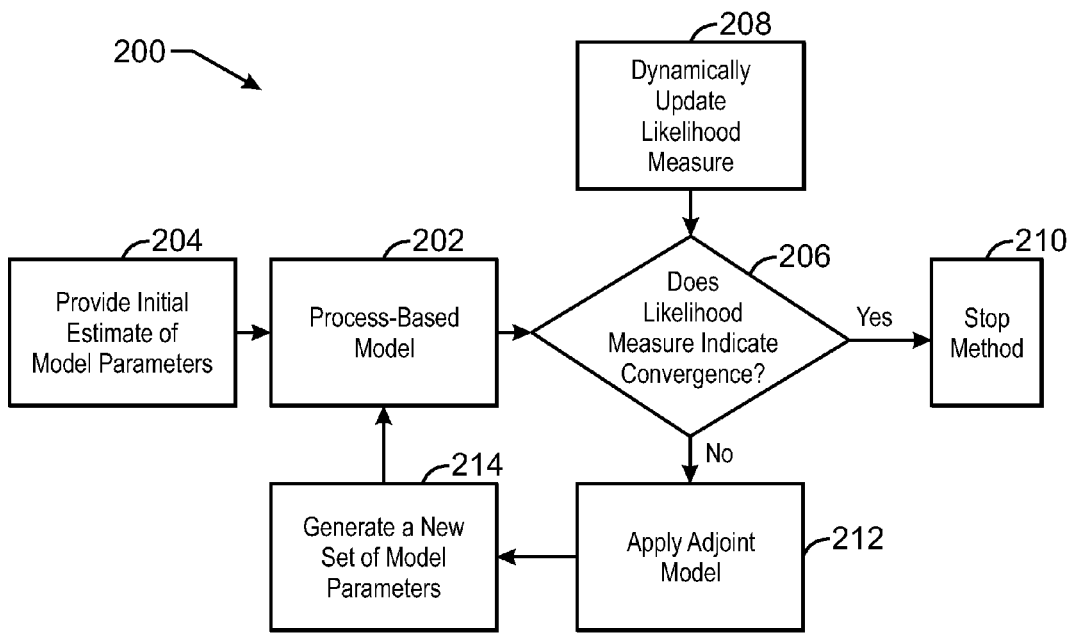
FIG. 2 is a process flow diagram showing a method for conditioning a complex process-based model using a dynamically updated likelihood measure.

FIG. 2 is a process flow diagram showing a method for conditioning a complex process-based model using a dynamically updated likelihood measure. The method is generally referred to by reference number 200. At block 202, a process-based model is adapted to predict data about a future condition of a complex environment, such as a portion of the earth's subsurface region. At block 204, an estimate of initial parameters is provided to the process-based model. Based on the initial estimate about the state of certain data parameters regarding the system being modeled, the process-based model may be used to predict the evolution of the system in both space and time.

At block 206, an evaluation is made regarding whether a likelihood measure applied to the output data provided by the process-based model indicates convergence between a current iteration of predicted and known data. Specifically, the data currently predicted by the process-based model may be fed into a likelihood function which determines the fitness of the current set of parameters, i.e., the degree to which the current set of parameters corresponds to known data as measured by the current likelihood measure.

As shown at block 208, the current likelihood measure may be dynamically updated. The dynamic updating of the likelihood measure may be performed based on a current realization or some measure derived from the history of previous realizations in the workflow process. For instance, in the context of a meandering system, the method 200 may be initially adapted to find model parameters to maximize the likelihood of matching some target meander bends. If the current iteration of predictive data is deemed unsatisfactory in that regard or the conditioning stalls for some reason because of a lack of convergence after a specified time period, the current likelihood measure may be augmented dynamically with another term that would drive the process to match some other available field data, e.g., cut-off regions decipherable from the seismic data. This may be mathematically achieved by adding an extra term to the objective function and the extent of its impact can be controlled by introducing weighting coefficients. Dynamic updating of the likelihood measure allows the method 200 to proceed rather than becoming stalled when, for example, discontinuous data is encountered. Moreover, dynamic updating of the likelihood measure may allow the process-based model 202 to avoid repetitively producing data that is not consistent with known data.

If data predicted by the process-based model of block 202 is within an acceptable range of the known data, the method 200 stops, as shown at block 210. If the predicted data is not within an acceptable range of known data, an adjoint method may be applied to condition the operation of the process-based model. Sensitivity information derived from the application of an adjoint method is then used to update the current estimate of input parameters passed on to the process-based model to compute the next iteration of predicted data, as shown at block 214. The method of iteratively refining the predicted data terminates (block 210) when the likelihood measure is higher than a prescribed likelihood limit as measured by the current likelihood measure. Alternatively, the method may terminate if a time-constraint gets violated. The process-based model and/or the predicted data may be outputted by displaying or outputted in other ways, and hydrocarbon extraction may be conducted based on the outputted/displayed model or data.

Figure 3:
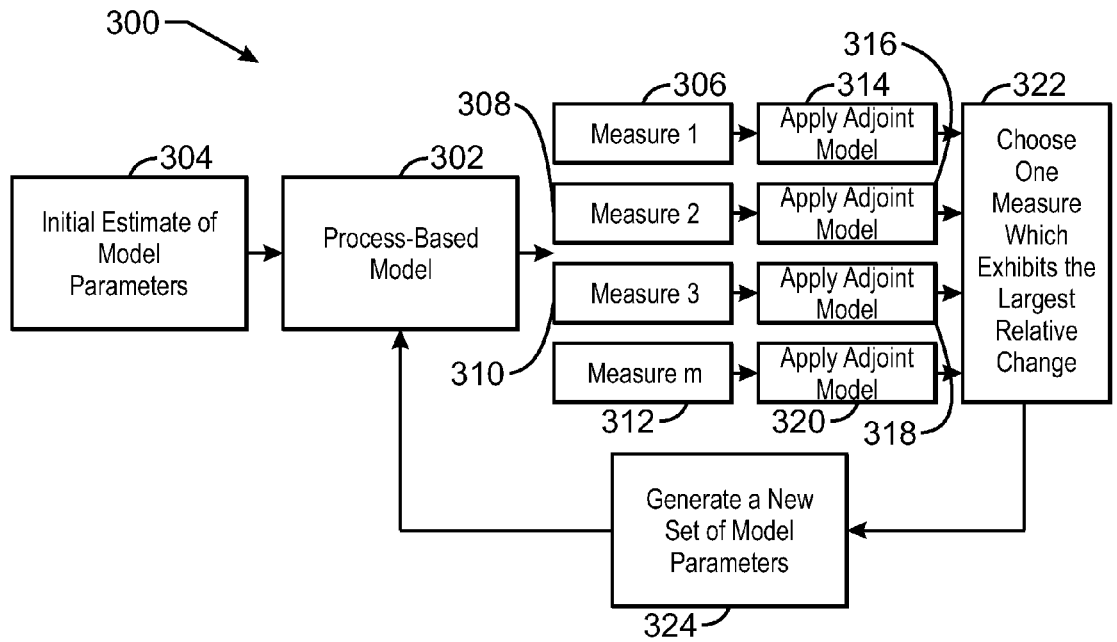
FIG. 3 is a process flow diagram showing a method for conditioning a complex process-based model using a plurality of likelihood measures.

FIG. 3 is a process flow diagram showing a method for conditioning a complex process-based model using a plurality of likelihood measures. The method is generally referred to by reference number 300. At block 302, a process-based model is adapted to predict data about a future condition of a complex environment, such as a portion of the earth's subsurface region. At block 304, an estimate of initial parameters is provided to the process-based model. Based on the initial estimate about the state of certain data parameters regarding the system being modeled, the process-based model may be used to predict the evolution of the system in both space and time.

The method 300 employs multiple likelihood measures. The use of multiple likelihood measures allows the method 300 to perform effectively for conditioning problems that relate to multiple extrema/discontinuities in the parameter space. Starting from the initial estimate, m likelihood measures and their respective gradients are computed. In particular, the method 300 makes use of a first likelihood measure (block 306), a second likelihood measure (block 308), a third likelihood measure (block 310), up to an mth likelihood measure (block 312). The value of m may change depending on the nature of the complex process being modeled by the process-based model. Moreover, the value of m is not an essential feature of the present invention. At block 314, an adjoint method may be performed on the results of the first likelihood measure. Similarly, other adjoint methods (blocks 316, 318, 320) may be performed respectively on the second likelihood measure (block 308), the third likelihood measure (block 310), up to the mth likelihood measure (block 312).

At block 322, a likelihood measure having the largest relative change as determined by the associated adjoint method is chosen. A new set of model input parameters is chosen based on the chosen likelihood measure, as shown at block 324, and a successive iteration is performed by the process-based model. The process continues in this manner until convergence is achieved.

A line search along these m directions provides the workflow with m new points in the parameter space. A line search in this context refers to a one-dimensional optimization process along the gradient direction provided by the adjoint method. If this procedure is repeated p times, the search will include $m^p$ points. A selection measure may be needed to limit the number of points for a finite size computational capacity. The process-based model and/or the predicted data may be outputted by displaying or outputted in other ways, and hydrocarbon extraction may be conducted based on the outputted/displayed model and/or the predicted data.

Figure 4:
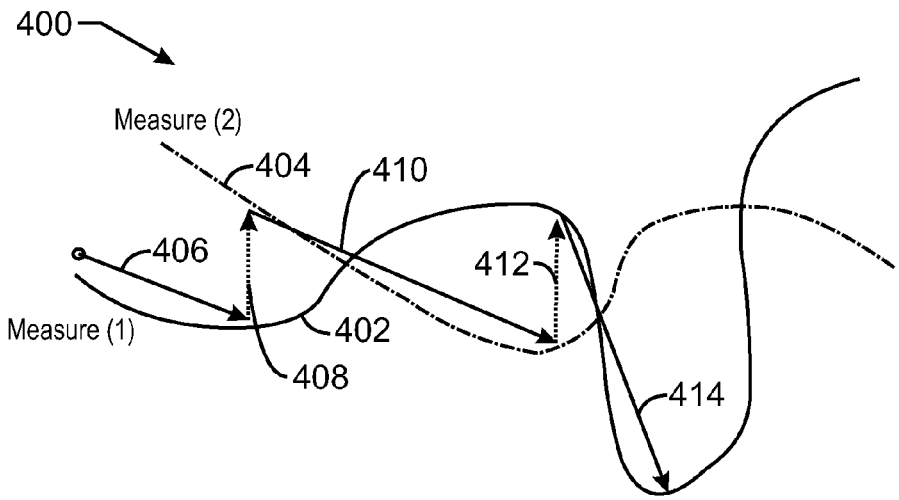
FIG. 4 is a graph showing the application of two likelihood measures to a complex varying parameter.

FIG. 4 is a graph showing the application of two likelihood measures to a complex varying parameter. The graph is generally referred to by reference number 400. Graph 400 is helpful in explaining the use of multiple likelihood measures in performing a conditioning process.

A combined measure of absolute and relative change of each likelihood measure in their corresponding line searches may be employed to select the likelihood measure that exhibits the largest amount of change. As such, at any point in the parameter space, only one likelihood measure will be active and drive the process until other measures catch up and the likelihood function will change subsequently. In the vicinity of a local extremum, the rate of change of the driving likelihood diminishes and a method of evaluation may automatically switch to another likelihood measure.

In FIG. 4, a first likelihood measure 402 represents the variation of likelihood measure (1) with respect to an $m^{th}$ parameter. A second likelihood measure 404 represents the variation of likelihood measure (2) with respect to the $m^{th}$ parameter. A first arrow 406 represents measure (1) being active while measure (2) is not used. A second arrow 408 represents the workflow decision to switch to measure (2) as the relative change of measure (2) dominates the return on measure (1). A third arrow 410 represents measure (2) being active while measure (1) is not used. A fourth arrow 412 represents the workflow decision to switch back to measure (1) as the relative change of measure (1) dominates the return on measure (2). A fifth arrow 414 represents measure (1) being active while measure (2) is not used.

An assumption may be made that, for some certain class of smooth conditioning problems with well-chosen/defined likelihood functions, a method as shown and described with reference to FIG. 3 is capable of escaping local extrema, i.e., not being stalled by discontinuous data. However, for problems with discontinuities, where the norm of the gradient does not diminish, success may be dependent on careful choice of likelihood measure and operator intervention to help the method avoid being stalled with suboptimal results. In this context, the desired likelihood measure is either known in advance or can be updated dynamically and/or interactively as described above with reference to FIG. 1 and FIG. 2.

Figure 5:
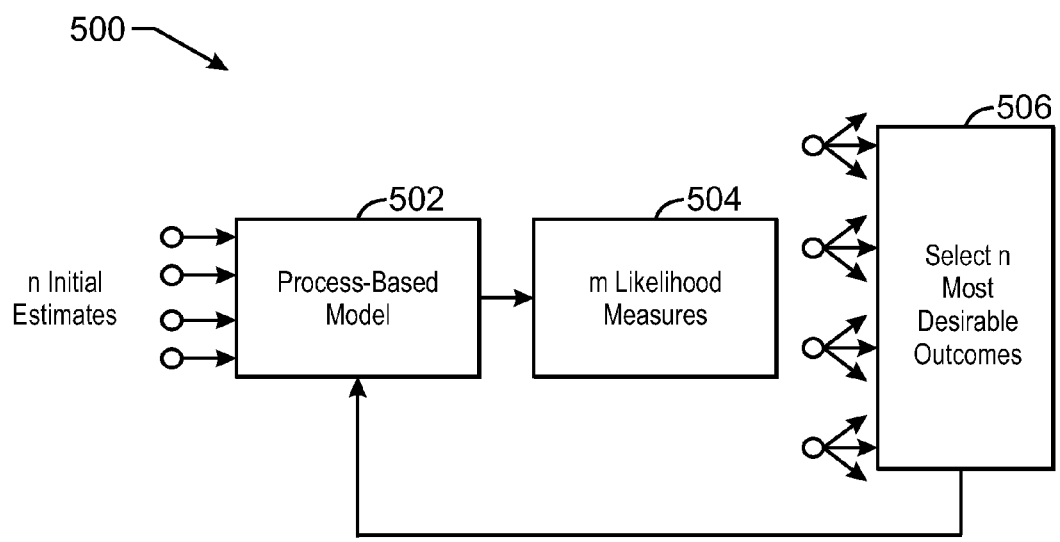
FIG. 5 is a process flow diagram showing a method for conditioning a complex process-based model using a plurality of likelihood measures and initial estimates (starting points)

FIG. 5 is a process flow diagram showing a method for conditioning a complex process-based model using a plurality of likelihood measure and initial guesses (estimates or starting points). The method is generally referred to by reference number 500. At block 502, a process-based model is adapted to predict data about a future condition of a complex environment, such as a portion of the earth's subsurface region. As shown in FIG. 5, n initial estimates are provided to the process-based model. Based on the n initial estimates about the state of certain data parameters regarding the system being modeled, the process-based model may be used to predict the evolution of the system in both space and time.

As shown at block 504, m likelihood measures and their respective gradients are computed. At block 506, the most desirable results are selected as described above with reference to FIG. 4. Successive iterations of data are computed by the process-based model 502. In this manner, n×m sub-conditioning problems may be solved and the n most promising candidates may be chosen by a user-defined selection procedure to replace the initial estimates in successive iterations. The process-based model and/or the predicted data may be outputted by displaying or outputted in other ways, and hydrocarbon extraction may be conducted based on the outputted/displayed model and/or predicted data.

Figure 6:
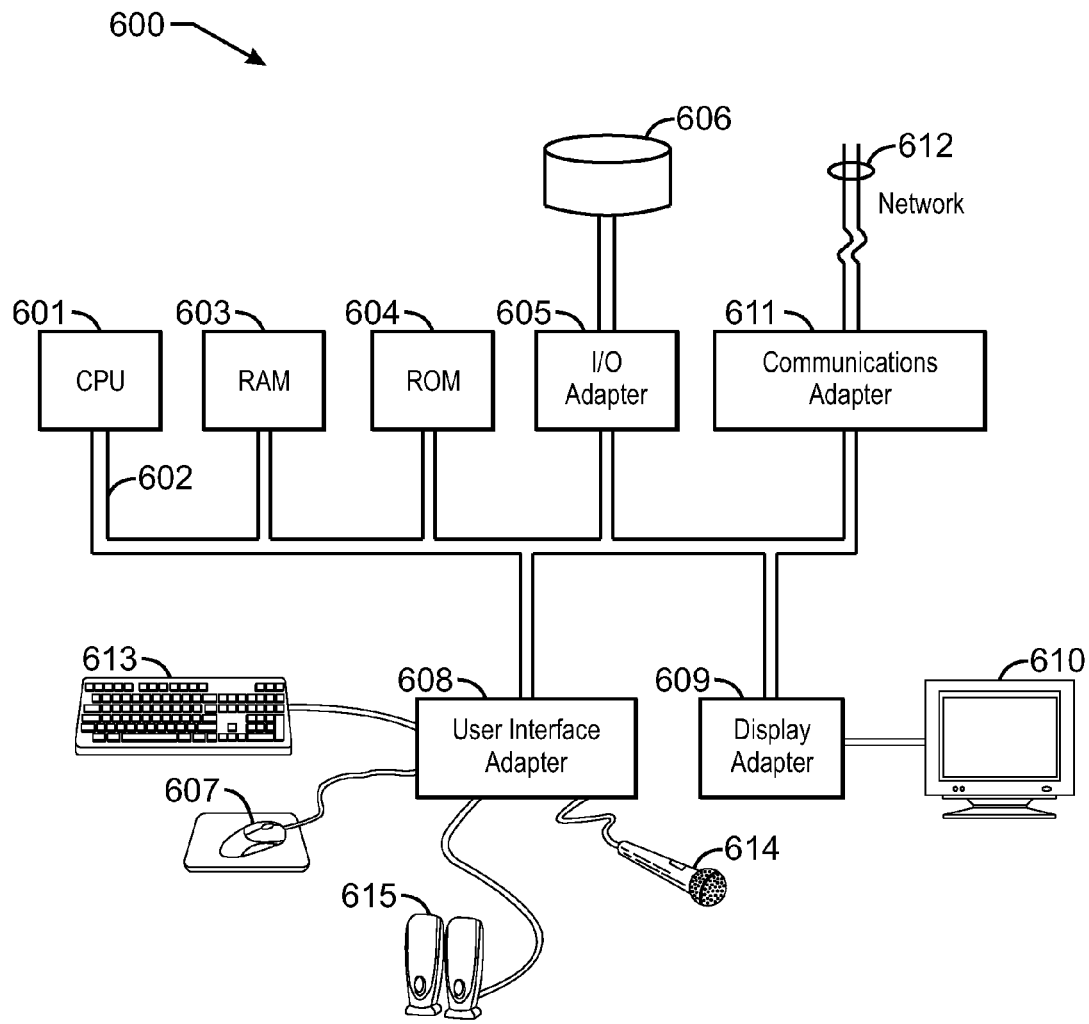
FIG. 6 is a block diagram of an exemplary computer network that may be used to perform a method for conditioning a processed-based model as disclosed herein.

FIG. 6 illustrates a computer system 600 on which software for performing processing operations or process steps or blocks as disclosed herein may be implemented. A central processing unit (CPU) 601 is coupled to system bus 602. The CPU 601 may be any general-purpose CPU, although other types of architectures of CPU 601 (or other components of exemplary system 600) may be used as long as CPU 601 (and other components of system 600) supports the inventive operations as described herein. The CPU 601 may execute the various logical instructions according to embodiments. For example, the CPU 601 may execute machine-level instructions for performing processing according to the operational flow described above in conjunction with FIG. 1, FIG. 2, FIG. 3, or FIG. 5.

The computer system 600 may also include random access memory (RAM) 603, which may be SRAM, DRAM, SDRAM, or the like. The computer system 600 may also include read-only memory (ROM) 604, which may be PROM, EPROM, EEPROM, or the like. RAM 603 and ROM 604 hold user and system data and programs, as is known in the art. The computer system 600 may also include an input/output (I/O) adapter 605, a communications adapter 611, a user interface adapter 608, and a display adapter 609. The I/O adapter 605, the user interface adapter 608, and/or communications adapter 611 may enable a user to interact with computer system 600 in order to input information.

The I/O adapter 605 preferably connects a storage device(s) 606, such as one or more of hard drive, compact disc (CD) drive, floppy disk drive, tape drive, etc. to computer system 600. The storage device(s) may be used when RAM 603 is insufficient for the memory requirements associated with storing data for operations of embodiments of the present invention. The data storage of the computer system 600 may be used for storing information and/or other data used or generated as disclosed herein. The communications adapter 611 may couple the computer system 600 to a network 612, which may enable information to be input to and/or output from system 600 via the network 612 (e.g., the Internet or other wide-area network, a local-area network, a public or private switched telephony network, a wireless network, any combination of the foregoing). User interface adapter 608 couples user input devices, such as a keyboard 613, a pointing device 607, and a microphone 614 and/or output devices, such as a speaker(s) 615 to the computer system 600. The display adapter 609 is driven by the CPU 601 to control the display on a display device 610 to, for example, display information or a representation pertaining to a portion of a subsurface region under analysis, such as displaying a generated 3D representation of a target area.

The architecture of system 600 may be varied as desired. For example, any suitable processor-based device may be used, including without limitation personal computers, laptop computers, computer workstations, and multi-processor servers. Moreover, examples may be implemented on application specific integrated circuits (ASICs) or very large scale integrated (VLSI) circuits. In fact, any number of suitable structures capable of executing logical operations may be used as desired or needed.

The disclosed techniques and methodologies may be susceptible to various modifications and alternative forms, and there is no intention to be limited to the examples discussed herein. Indeed, the disclosed techniques and methodologies include all alternatives, modifications, and equivalents falling within the spirit and scope of the appended claims.

What is claimed is:

1. A computer implemented method for correlating predicted data describing a subsurface region with known data describing the subsurface region, the method comprising:
   obtaining data describing an initial state of the subsurface region; predicting data describing a subsequent state of the subsurface region; updating a likelihood measure that determines whether the predicted data is within an acceptable range of the obtained data, the updating being performed at least one of dynamically and interactively;
   using a computer to compare the predicted data with the obtained data using the likelihood measure;
   using a computer to determine a sensitivity of the predicted data if the predicted data is not within an acceptable range of the obtained data as measured by the likelihood measure;
   adjusting the data describing the initial state of the subsurface region based on the sensitivity before performing a subsequent iteration of predicting data describing the subsequent state of the subsurface region, wherein the adjusting is performed based on the likelihood measure having the largest change in sensitivity, such that at any point in parameter space only the likelihood measure that produces the largest change in sensitivity is chosen and drive the process until other measures catch up and the likelihood measure changes subsequently; and
   outputting the predicted data based on the adjusting.

2. The method for correlating predicted data recited in claim 1, comprising terminating the method if the predicted data is within the acceptable range of the obtained data.

3. The method for correlating predicted data recited in claim 1, wherein determining the sensitivity of the predicted data is performed via an adjoint method.

4. The method for correlating predicted data recited in claim 1, wherein predicting data describing a subsequent state of the subsurface region is performed via a process-based model.

5. The method for correlating predicted data recited in claim 1, wherein the data describing the initial state of the subsurface region comprises a plurality of estimates describing the initial state of the subsurface region.

6. The method for correlating predicted data recited in claim 1, comprising comparing the predicted data with the obtained data using at least a second likelihood measure if the sensitivity does not indicate an acceptable change in the comparison of the predicted data with the obtained data.

7. The method for correlating predicted data recited in claim 6, wherein adjusting the data describing the initial state of the subsurface region is performed based on the likelihood measure that produces the largest change in sensitivity.

8. The method for correlating predicted data recited in claim 1, wherein the predicted data is outputted by displaying the predicted data.

9. The method for correlating predicted data recited in claim 1, further comprising extracting hydrocarbons from the subsurface region using the predicted data if the predicted data is within an acceptable range of the obtained data.

10. A method for producing hydrocarbons from an oil and/or gas field, the method comprising:
    obtaining data describing an initial state of a subsurface region containing at least a part of the oil and/or gas field;
    predicting data describing a subsequent state of the subsurface region; updating a likelihood measure that determines whether the predicted data is within an acceptable range of the obtained data, the updating being performed at least one of dynamically and interactively;
    comparing the predicted data with the obtained data using the likelihood measure;
    determining a sensitivity of the predicted data if the predicted data is not within an acceptable range of the obtained data as measured by the likelihood measure;
    adjusting the data describing the initial state of the subsurface region based on the sensitivity before performing a subsequent iteration of predicting data describing the subsequent state of the subsurface region, wherein the adjusting is performed based the likelihood measure having the largest change in sensitivity, such that at any point in parameter space only the likelihood measure that produces the largest change in sensitivity is chosen and drive the process until other measures catch up and the likelihood measure changes subsequently; and
    extracting hydrocarbons from the oil and/or gas field using the predicted data if the predicted data is within an acceptable range of the obtained data.

11. The method for producing hydrocarbons recited in claim 10, wherein determining the sensitivity of the predicted data is performed via an adjoint model.

12. The method for producing hydrocarbons recited in claim 10, wherein predicting data describing a subsequent state of the subsurface region is performed via a process-based model.

13. The method for producing hydrocarbons recited in claim 10, wherein the data describing the initial state of the subsurface region comprises a plurality of estimates describing the initial state of the subsurface region.

14. The method for producing hydrocarbons recited in claim 10, comprising comparing the predicted data with the obtained data using at least a second likelihood measure if the sensitivity does not indicate an acceptable change in the comparison of the predicted data with the obtained data.

15. The method for producing hydrocarbons recited in claim 14, wherein adjusting the data describing the initial state of the subsurface region is performed based on the likelihood measure that produces the largest change in sensitivity.

16. A computer system that is configured to correlate predicted data describing a subsurface region with obtained data describing the subsurface region, the computer system comprising:
- processor; and a non-transitory machine-readable storage medium that stores tangible, machine-readable instructions for execution by the processor, the tangible, machine-readable instructions comprising:
- code that is configured to obtain data describing an initial state of the subsurface region;
- code that is configured to predict data describing a subsequent state of the subsurface region;
- code that is configured to update a likelihood measure that determines whether the predicted data is within an acceptable range of the obtained data, the updating being performed at least one of dynamically and interactively;
- code that is configured to compare the predicted data with the obtained data using the likelihood measure;
- code that is configured to determine a sensitivity of the predicted data if the predicted data is not within an acceptable range of the obtained data as measured by the likelihood measure; and
- code that is configured to adjust the data describing the initial state of the subsurface region based on the sensitivity before performing a subsequent iteration of predicting data describing the subsequent state of the subsurface region, wherein the adjusting is performed based on the likelihood measure having the largest change in sensitivity, such that at any point in parameter space only the likelihood measure that produces the largest change in sensitivity is chosen and drive the process until other measures catch up and the likelihood measure changes subsequently.

* * * * *